3,642,757
POLY-CIS-1,2-DIVINYLCYCLOHEXANE AND METHOD FOR PREPARING THE SAME

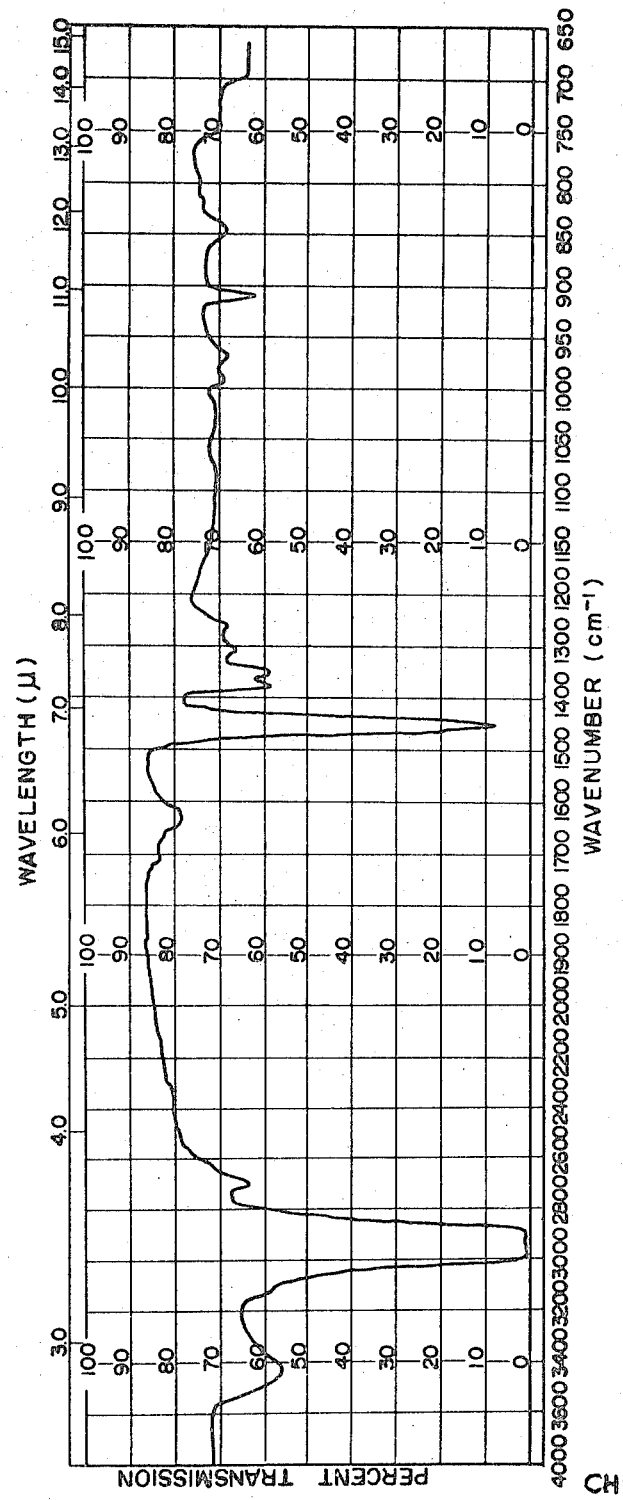
INVENTORS:
CHUJI ASO,
TOYOKI KUNITAKE,
and HAKARU UCHIO
BY: Burgess, Dinklage & Sprung
ATTORNEYS

Chuji Aso and Toyoki Kunitake, Fukuoka-shi, and Hakaru Uchio, Tokyo, Japan, assignors to Asahi Kasei Kogyo Kabushiki Kaisha, Osaka, Japan
Filed Oct. 28, 1969, Ser. No. 871,890
Claims priority, application Japan, Nov. 5, 1968, 43/80,832
Int. Cl. C08f 7/02
U.S. Cl. 260—93.1
5 Claims

ABSTRACT OF THE DISCLOSURE

Poly-cis-1,2-divinylcyclohexane having excellent thermal stability and chemical resistance comprising recurring units of the formula

wherein $n$ is polymerization degree, which is a novel polymer and can be fabricated into films and other shaped articles, is prepared by contacting cis-1,2-divinylcyclohexane with at least one acidic metal halide with optional addition of lower alkyl aluminium compounds, lower alkyl zinc compounds, protonic acids or active halides such as chloromethyl ether, epichlorohydrin, t-butyl chloride and benzyl chloride.

---

This invention relates to a novel polymer, and more particularly, to poly-cis-1,2-divinylcyclohexane as well as to the method by which the polymer is prepared. The polymer of the present invention possesses excellent thermal stability and chemical resistance and may be fabricated into films and other shaped articles.

The first interesting report relating to novel intermolecular-intramolecular polymerization or cyclopolymerization of non-conjugated divinyl compounds was given by G. B. Butler and R. J. Angelo in "Journal of American Chemical Society," vol. 79, p. 3128 (1957). Since then, many researches on the cyclopolymerization have been made. These researches, however, have been limited to the cyclopolymerization of aromatic divinyl compounds such as o-divinylbenzene and straight chain aliphatic compounds such as divinyl ether (see Journal of the Chemical Society of Japan (Industrial Chemistry Section) vol. 70, part 11, pp. 1920–1925 (1967)), and no researches were reported on the cyclopolymerization of aliphatic cyclic compounds such as divinylcyclohexane.

The present inventors have found, during their investigation of polymerization of cis-1,2-divinylcyclohexane, that the compound can be cyclopolymerized in the presence of a specific catalyst to produce the polymer possessing excellent properties suitable for use as fabricating materials.

It is therefore an object of the present invention to provide novel poly-cis-1,2-divinylcyclohexane.

It is a further object of the present invention to provide a method for producing poly-cis-1,2-divinylcyclohexane.

The novel poly-cis-1,2-divinylcyclohexane which forms the basis for the present invention can be represented by recurring units of the formula

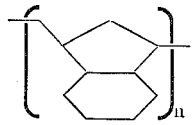

wherein $n$ is polymerization degree of the polymer, softening point of the polymer ranging from 100–160° C.

The molecular weight of the polymer may range from 1200 to 3000. The structure of this novel polymer has been determined by infrared spectroscopy in which the absorption resulting from double bonds were not found, and by solubility in various solvents. The existance of such polymer has not been as yet reported in any existing literature.

The polymer of the present invention may readily be dissolved in common organic solvents, such as benzene and toluene, and fabricated into films and other shaped articles, which justifies its valuable utility in various commercial acceptances.

The polymer of the present invention is prepared by a method in which cis-1,2-divinylcyclohexane is contacted with a polymerization catalyst specified as below.

The polymerization catalyst of the present invention comprises at least one of acidic metal halides such as boron trifluoride, aluminium trichloride $AlCl_3$, stannic tetrachloride, ferric trichloride $FeCl_3$, titanium tetrachloride, alkyl aluminium dichloride and dialkyl aluminium chloride. The polymerization reaction may be effected more advantageously by the addition to the reaction system, as a promoter, of at least one compound selected from the group consisting of, lower alkyl aluminium compounds having alkyl groups of not more than 5 carbon atoms such as tri-ethyl-aluminium and tri-i-butyl aluminium, lower alkyl zinc compounds having alkyl groups of not more than 5 carbon atoms, protonic acids such as hydrochloric acid, perchloric acid and sulfuric acid, and active halides such as chloromethylether, epichlorohydrin, t-butyl chloride and benzyl chloride.

The most preferable combination is ethyl aluminium dichloride and t-butyl chloride.

Amount of the catalyst to be used ranges from 1 mole percent to 20 mole percent, preferably from 5 mole percent to 10 mole percent of the monomer.

The amount of the promoter may be such that the molar ratio of promoter to the catalyst be not greater than 1.

It is particularly noted that, when said lower alkyl aluminium compound or lower alkyl zinc compound is used in combination with said acidic metal halide, the ratio of alkyl to halogen is not greater than 1. The amount of alkyl being greater than that as specified, the activity of the catalyst is lowered.

Cis-1,2-divinylcyclohexane, which is the monomer used in the present invention may be readily obtained in the conventional manner, for example, by the reaction between butadiene and ethylene and the subsequent rearrangement of the product.

Although the formation of the polymer of the present invention may be carried out by bulk polymerization, the solution polymerization in the presence of an inert solvent gives rise to uniform polymerization, and therefore, is more preferable.

Suitable reaction media include aromatic hydrocarbons such as benzene, toluene and xylene; aliphatic hydrocarbons such as pentane and heptane; and halogenated hydrocarbons such as methylene chloride, chloroform, carbon tetrechloride. Either single solvent or mixtures of at least two of them may be used.

The use of a suitable solvent gives the polymer end-capped with hydroxyl group.

In some cases the polymerization reaction may be affected by solvents, which shows that careful choice of the solvent is desired.

Although the polymerization reaction can be conducted following table were adopted. The infrared spectrum of the product obtained in Example 7 was measured in KBr tablet and shown in the attached figure.

TABLE

| Example Number | Concentration of monomer mol/lit. | Catalyst and the concentration | Solvent | Reaction temp. (° C.) | Reaction time(hr.) | Molecular weight of the product | Softening point (° C.) | Yield (percent) |
|---|---|---|---|---|---|---|---|---|
| 2 | 0.94 | $Al(C_2H_5)_3$ and $TiCl_4$<br>$Al(C_2H_5)_3/TiCl_4=\frac{1}{2}$*<br>$TiCl_4=0.1$ mol/lit | Benzene | 70 | 20 | 1,200 | 116 | 90 |
| 3 | 0.94 | $Al(C_2H_5)_2Cl$ and $TiCl_4$<br>$Al(C_2H_5)_2Cl/TiCl_4=\frac{1}{2}$<br>$TiCl_4=0.1$ mol/lit | Heptane | 70 | 40 | 1,200 | 100–105 | 92 |
| 4 | 0.94 | $AlCl_3$<br>0.12 mol/lit | Methylene dichloride | 10 | 24 | 3,000 | 145–155 | 65 |
| 5 | 0.94 | $AlC_2H_5Cl_2$ and $TiCl_4$<br>$AlC_2H_5Cl_2/TiCl_4=2$<br>$AlC_2H_5Cl=0.1$ mol/lit | Pentane | 0 | 24 | 2,500 | 130–135 | 50 |
| 6 | 1.0 | $Al(C_2H_5)_2Cl$ and $t$-$C_4H_9Cl$<br>$Al(C_2H_5)_2Cl/t$-$C_4H_9Cl=2$<br>$Al(C_2H_5)_2Cl=0.2$ mol/lit | Methylene dichloride | 0 | 230 | 1,200 | 100–105 | 35 |
| 7 | 1.0 | $AlC_2H_5Cl_2$ and $t$-$C_4H_9Cl$<br>$AlC_2H_5Cl_2/t$-$C_4H_9Cl=2$<br>$AlC_2H_5Cl_2=0.05$ mol/lit | Heptane | 0 | 24 | 2,000 | 125–135 | 90 |
| 8 | 1.0 | $TiCl_4$ and $C_6H_5CH_2Cl$<br>$TiCl_4/C_6H_5CH_2Cl=2$<br>$TiCl_4=0.05$ mol/lit | Benzene | 0 | 20 | 2,000 | 100–105 | 90 |
| 9 | 1.0 | $AlC_2H_5Cl_2$ and $CH_3OCH_2Cl$<br>$AlC_2H_5Cl_2/CH_3OCH_2Cl=2$<br>$AlC_2H_5Cl_2=0.2$ mol | Heptane | 0 | 24 | 2,500 | 100–105 | 90 |

*Ratio is molar ratio.

at temperatures ranging from −50 to 90° C., the preferable range is between −10 and 70° C.

The polymerization reaction is continued for 1 to 250 hours, depending on reaction temperature, catalysts and amount of the catalyst used.

In general, polymerization reaction may be conducted in a closed system. The typical embodiment of the reaction may be as follows; the catalyst, the promoter if desired, the solvent and cis-1,2-divinylcyclohexane may be mixed in a nitrogen stream and then allowed to react in a thermostat for a predetermined period of time; thereafter the resultant reaction mixture is poured into non-solvent such as methanol, ethanol, containing a smaller amount of hydrochloric acid, to precipitate polymer.

The presence of hydrochloric acid in said non-solvent is effective to the decomposition and the removal of the catalyst, and therefore, is optional.

The form of the obtained polymer may be powder or gel.

If necessary, thus obtained polymer is purified by repeatedly dissolving and precipitating the polymer.

The feature of the present invention can more fully be understood by following non-limiting illustrative examples.

EXAMPLE 1

A mixture of triethylaluminium and titanium tetrachloride in a 1:1 molar ratio was prepared in benzene in a branched ampule which has been thoroughly flushed with nitrogen, with the concentration of titanium in the mixture being 0.1 mol/lit.

To thus obtained mixture was added 1 ml. of monomer, cis-1,2-divinylcyclohexane, in order to prepare the reactant mixture with the concentration of said monomer of 1 mol/lit. Then the ampule was placed in a thermostat maintained at 72° C. for 8 hours to complete polymerization.

The resultant mixture was poured into methanol containing a small amount of hydrochloric acid, in order to precipitate polymer, which was then filtered and dried, giving polymer product in 42% yield. The softening point of the polymer product was 115° C. The molecular weight was measured with a vapor pressure osmometer to be 1100.

EXAMPLES 2–7

Each example was conducted in the same manner as in Example 1 except that the conditions as specified in the

What is claimed is:

1. Method for preparing poly-cis-1,2-divinylcyclohexane comprising recurring units of the formula

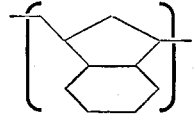

and having a molecular weight from about 1200 to 3000, which comprises polymerizing cis-1,2-divinylcyclohexane in the presence of the polymerization catalyst comprising at least one acidic metal halide at an amount ranging from 1 mole percent to 20 mole percent of said cis-1,2-divinylcyclohexane at a reaction temperature between −50° C. and 90° C.

2. Method as claimed in claim 1, wherein a promoter comprising at least one compound selected from the group consisting of lower alkyl aluminium compounds having alkyl groups of not more than 5 carbon atoms, lower alkyl zinc compounds having alkyl groups of not more than 5 carbon atoms, protonic acids and active halides is added to the reaction system.

3. Method as claimed in claim 1, wherein the polymerization of cis-1,2-divinylcyclohexane is carried out in an inert solvent.

4. Method as claimed in claim 2, wherein said polymerization catalyst is ethyl aluminium dichloride and said active halide, as a promoter, is t-butyl chloride.

5. Poly-cis-1,2-divinylcyclohexane comprising recurring units of the formula

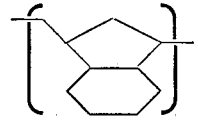

and having a molecular weight from about 1200 to 3000.

References Cited

UNITED STATES PATENTS 3,049,525    8/1962    Benning _____ 260—93.5
3,297,672    1/1967    Ketley _____ 260—93.1

FOREIGN PATENTS 1,162,566    2/1964    Germany _____ 260—93.1

JOSEPH L. SCHOFER, Primary Examiner

R. A. GAITHER, Assistant Examiner